Figure 1:
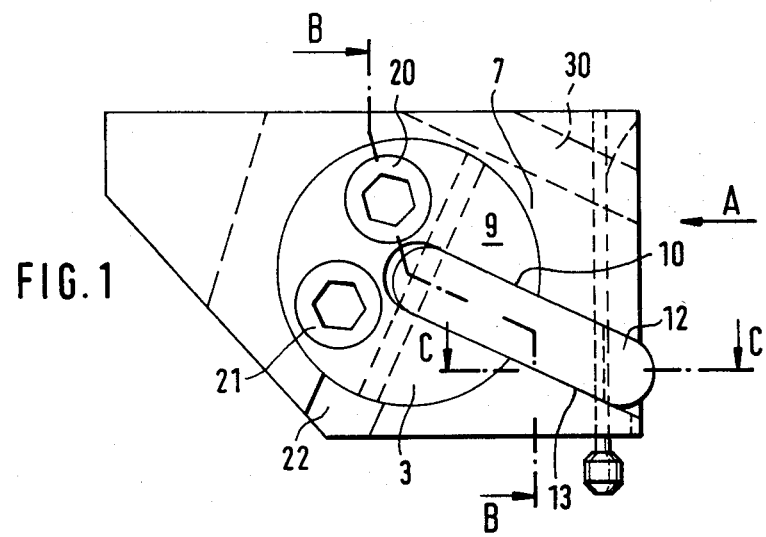

United States Patent [19]

Kinshofer

[11] Patent Number: 4,488,832
[45] Date of Patent: Dec. 18, 1984

[54] LOCKING DEVICE FOR ATTACHING IMPLEMENTS TO CONVERTIBLE MACHINES

[76] Inventor: Alfred Kinshofer, Wendelsteinstrasse 8, 8160 Miesbach, Fed. Rep. of Germany

[21] Appl. No.: 388,190

[22] Filed: Jun. 14, 1982

[30] Foreign Application Priority Data

Jun. 15, 1981 [DE] Fed. Rep. of Germany ....... 3123692

[51] Int. Cl.³ .............................................. F16B 21/09
[52] U.S. Cl. ................................... 403/316; 414/607; 403/330
[58] Field of Search ............... 403/330, 316, 317, 321, 403/DIG. 4; 414/607, 667, 671; 292/210

[56] References Cited

U.S. PATENT DOCUMENTS 3,819,078 6/1974 Walsh .................................. 414/671
4,095,714 6/1978 Schuster .............................. 414/607
4,230,434 10/1980 Seaberg .............................. 414/607

Primary Examiner—Cornelius J. Husar
Assistant Examiner—Joseph A. Fischetti
Attorney, Agent, or Firm—Fleit, Jacobson, Cohn & Price

[57] ABSTRACT

In a locking device for attaching implements to convertible machines, preferably for fixing attachments to lifting slides of forklift trucks which comprise plate- or rail-like supports, which are adapted to carry the implements or attachments, which have retaining claws for interengaging with the supports, a locking member is rotatably mounted and axially immovably mounted on a disc-shaped axle, which is adapted to be connected to the implement or attachment, and said locking member is pivotally movable between open and locking positions and in its locking position is adapted to be positively coupled to the axle by a retaining element.

11 Claims, 8 Drawing Figures

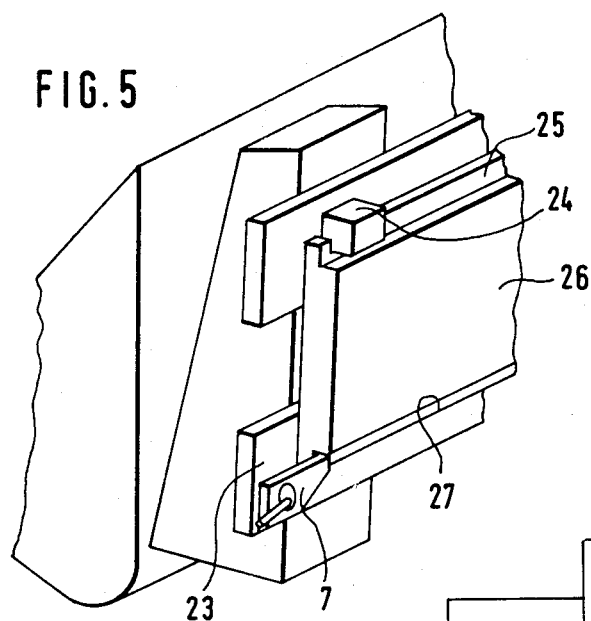
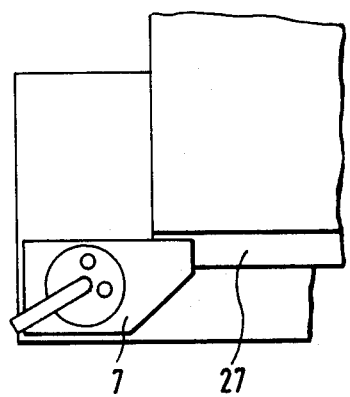
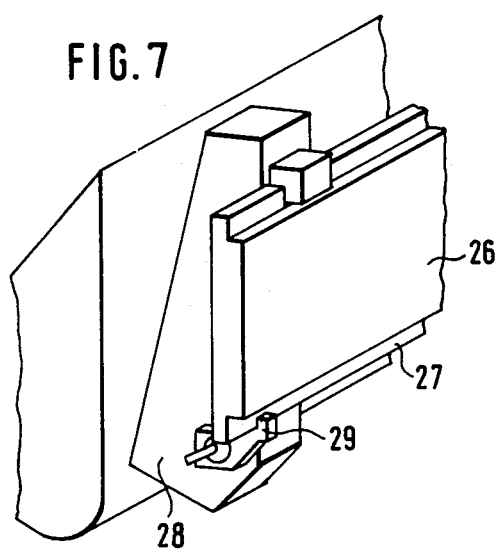
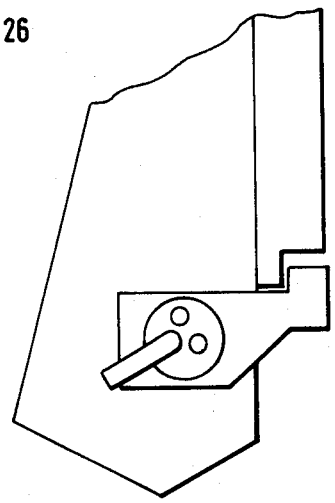

LOCKING DEVICE FOR ATTACHING IMPLEMENTS TO CONVERTIBLE MACHINES

This invention relates to a locking device for attaching implements to convertible machines, preferably for fixing attachments to lifting slides of forklift trucks which comprise plate- or rail-like supports, which are adapted to carry the implements or attachments, which have retaining claws for interengaging with the supports.

In order to increase the field of application and economy of forklift trucks, it is known to remove the prongs from the lifting slides and to secure attachments to said slides. Such attachments may consist, e.g., of carrying mandrels, crane attachments, grippers for scrap or lumber, scoops or tipping buckets. The lifting slides of forklift trucks are usually provided with a shield, which has parallel top and bottom edges, which are engageable from behind. The attachments usually have top claws, which are rigid with the attachment and are applied to the top edges of the shields. The lower edges of the shield must be connected to the attachments by clamping elements or the like, which are actuated by screws. Because the screws for actuating the clamping elements or the like often can be tightened and loosened only with difficulty, the replacement of an attachment usually requires laborious and time-consuming work.

It is an object of the invention to provide a locking device which is of the kind stated first hereinbefore and which is reliable and can be actuated quickly and in a simple manner.

This object is accomplished according to the invention in that a locking member is rotatably mounted and axially immovably mounted on a disc-shaped axle, which is adapted to be connected to the implement or attachment, and said locking member is pivotally movable between open and locking positions and in its locking position is adapted to be positively coupled to the axle by a retaining element. The locking device according to the invention can be used, e.g., to connect an attachment to the lifting slide of a forklift truck without a need for screws in that the locking member is pivotally moved from its open position to its locking position and is blocked therein.

In a special embodiment of the invention the locking member is provided with a bore, which is outwardly enlarged by an annular peripheral recess defined by a shoulder, and is rotatably mounted on the disc-shaped axle, which is substantially complementary to the locking member in axial sectional shape and is formed with an annular shoulder, and the axle is screw-connected to a baseplate, which is larger in diameter so that the locking member with its rear annular portion, which is smaller in diameter, is axially immovably held between the baseplate and the annular shoulder of the axle. Because the axle is disc-shaped and has only a small axial length, it can take up large locking torques. The mounting of the locking member on the axle only by a stepped annular portion results in a simple, rugged structure.

According to a further feature of the invention the axle is provided in its end face with a radial groove, which is aligned with a groove in the outside surface of the locking member when the latter is in its locking position, a retaining lever is pivoted in the groove of the axle on a pivot pin which extends transversely through the axle, and the retaining lever is pivotally movable into the groove of the locking member and adapted to be locked therein. The retaining lever acts like a key and in locking position holds the locking member against rotation on the axle.

According to a further feature of the invention a safe and simple actuation is ensured in that the retaining lever is adapted to be locked by a resilient pin, which extends transversely through the groove in the locking member and into a groove which is formed in the forked retaining lever between the prongs thereof, the lower of which is shorter than the upper one. To ensure that the spring-loaded pin will reliably snap into the retaining groove of the retaining lever, the lower prong of the lever may have an outside surface which tapers in the shape of a wedge and which during the inward pivotal movement of the retaining lever engages the pin, which bears on the inner end of the slot. Outside the slot, the pin may be provided with an actuating head. On that side of the groove which is opposite to the slot, the pin consisting of spring wire extends suitably in a groove which has a closed end and the rear end of the pin is held in the part which closes the end of that groove. The resilient pin is held in such a manner that it will bear under initial stress on the inner end of the slot disposed on the outside.

For the fixation of the locking device to the implement or attachment, the axle and the baseplate may have two parallel, aligned bores, through which fixing bolts can be inserted.

The locking member may be trapezoidal and may be provided at its free end with a hook-shaped nose for engaging from behind the edge of the shield of a forklift truck or the like.

The locking member may have a bore, which is adapted to receive an extension lever for actuating the locking member.

Figure 2:
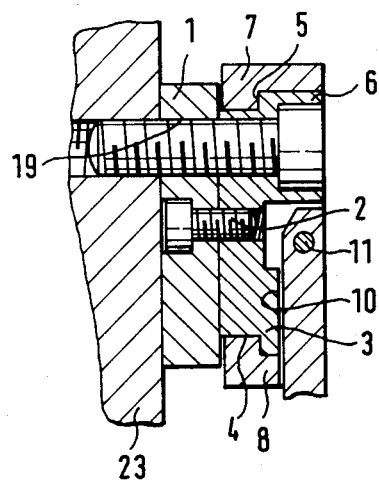
Figure 3:
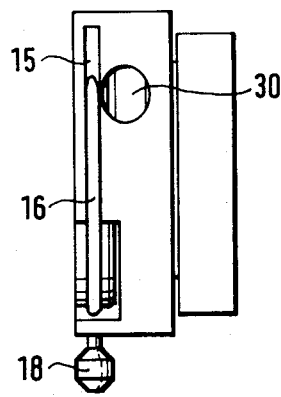
Figure 4:
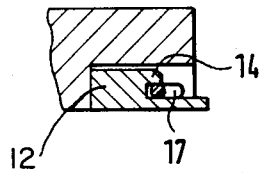

Illustrative embodiments of the invention will now be described more in detail with reference to the accompanying drawings, in which FIG. 1 is a top plan view showing the locking device, FIG. 2 is a sectional view taken on line B—B of FIG. 1, FIG. 3 an elevation showing the locking device viewed in the direction of the arrow A in FIG. 1, FIG. 4 is an inverted sectional view taken on line C—C in FIG. 1, FIG. 5 is a perspective view of a scoop, which constitutes an attachment secured to the shield of a forklift truck by means of the locking device, FIG. 6 is a top plan view showing the locking device of FIG. 5 in locking position, FIG. 7 is a perspective view showing a scoop which is attached to the shield of a forklift truck by means of a locking device having a locking nose and FIG. 8 is a side elevation showing the locking device of FIG. 7 in locking position.

The locking device shown in FIGS. 1 to 4 comprises a baseplate 1 and a disc-shaped axle 3, which is connected to the baseplate 1 by a screw 2. The axle 3 has a rear portion 4, which is smaller in diameter, an outer portion 6, which is larger in diameter, and an annular shoulder 5 between portions 4 and 6. The locking member 7 is rotatably mounted and axially immovably mounted on the axle 3 and has a stepped bore, which is complementary to the axle 3. At the rear end of the bore in the locking member 7, the latter has an annular portion 8, which constricts the bore and interengages with the annular shoulder 5 of the axle 3. The axial length of the annular portion 8 is slightly smaller than the distance from the annular shoulder 5 to the baseplate 1 so that there is adequate play permitting a rotation of the locking member 7 on the axle 3.

The end face 9 of the axle 3 is formed with a radial groove 10, in which a retaining lever 12 is pivoted on a pivot pin 11, which extends transversely through the groove 10. The locking member 7 is formed with a groove 13, which is aligned with the groove 10 when the locking member is in its locking position. It is apparent from FIGS. 1 to 4 that the retaining lever 12 is adapted to be pivotally movable into the groove 13 for a positive connection.

The retaining lever 12 has a forked free end portion comprising a lower prong 14 which is shorter than the overlying upper prong.

The locking member 7 has an outwardly open groove 15, which contains a spring wire pin 16, which at its rear end is secured in a bore, which is an extension of the groove 15. The forward end portion of the resilient pin 16 extends through a slot 17 formed in a side wall of the locking member 7. The resilient pin 13 is mounted in its fixing bore to bear under initial stress on the inner edge of the slot 17. The free end portion of the resilient pin protrudes from the slot 17 and carries an actuating head 18. For a reliable locking of the retaining lever 12 in the grooves 10 and 13, the resilient pin 16 enters the groove formed in the forked end of the retaining lever 12 as is shown in the drawing.

The locking device is adapted to be connected to the attachment by means of screws 20, 21 inserted through bores 19, which extend through the axle 3, the baseplate 1 and are screwed into tapped bores in a crosspiece 23 of the attachment.

The locking member 7 has an additional groove 22, which is aligned with the groove 10 when the locking member 7 is in its open position.

In the manner shown in FIGS. 5 and 6, the locking member 7 can be connected to a crosspiece 23 of an attachment, which has a top claw 24, which is adapted to be hooked over the stepped top edge of the shield 25. To lock the attachment, the locking member 7 is then turned to its locking position, which is apparent from FIGS. 5 and 6 and in which the locking member 7 overlaps the offset lower edge portion 27 of the shield 26. In the embodiment shown in FIGS. 7 and 8, the locking device is secured to the side face of a bracket 28 of the attachment end its locking member has a projecting hook, which interengages with the lower end portion 27 of the shield 26.

The arrangement shown in FIGS. 5 and 6 may be used when the mounting surfaces of the attachment are longer than the shield of the forklift truck. In the embodiment shown in FIGS. 7 and 8, the shield 26 is longer than the clearance between the brackets 28 of the attachment.

A bore 30 for inserting a crowbar or the like is formed in the locking member 7, as is apparent from FIGS. 1 and 3.

What is claimed is:

1. A locking device for attaching implements to convertible machines, preferably for fixing attachments to lifting slides of forklift trucks, the lifting slides comprise plate or rail-like supports adapted to carry the implements or attachments, the implements or attachments having retaining claws for interengaging with the supports, said locking device comprising a disc-shaped axle, a locking member rotatably mounted and axially immovably mounted on the disc-shaped axle, said axle adapted to be connected to the implement or attachment, said locking member being pivotally movable between open and locking positions and in its locking positon being adapted to be positively coupled to the axle by a retaining element, a radial groove being provided in the end face of said axle, a second groove defined in the outside surface of the locking member being aligned with said radial groove when said second groove is in its locking position, a forked retaining lever being pivoted in the groove of the axle, a pivot pin extending transversely through the axle, the forked retaining lever being pivoted on the pivot pin, and the forked retaining lever being pivotally movable into the groove of the locking member and adapted to be locked therein.

2. A locking device according to claim 1, characterized in that the locking member is provided with a bore, which is outwardly enlarged by an annular peripheral recess defined by a shoulder, and is rotatably mounted on the disc-shaped axle, which is substantially complementary to the locking member in axial sectional shape and is formed with an annular shoulder, and the axle is screw-connected to a baseplate, which is larger in diameter so that the locking member with its rear annular portion, which is smaller in diameter, is axially immovably held between the baseplate and the annular shoulder of the axle.

3. A locking device according to claim 2, characterized in that the retaining lever is adapted to be locked by a resilient pin, said resilient pin extending transversely through the groove in the locking member and into a groove formed in the forked retaining lever between the prongs thereof, the lower prong being shorter than the upper one.

4. A locking device according to claim 3, characterized in that the lower prong of the lever has an outside surface tapering in the shape of a wedge and the lower prong, during the inward pivotal movement of the retaining lever, engages the pin, said pin bearing on the inner end of a slot defined by a side wall of the locking member.

5. A locking device according to claim 4, characterized in that the pin is provided with an actuating head outside the slot.

6. A locking device according to claim 5, characterized in that on that side of the groove formed in the forked retaining lever opposite to the slot, the pin consisting of spring wire extends suitably in a groove having a closed end and the rear end of the pin is held in the part of the groove having the closed end.

7. A locking device according to claim 6, characterized in that the axle and the baseplate have two parallel, aligned bores for receiving screws for securing the locking device to the implement or attachment.

8. A locking device according to claim 7, characterized in that the locking member has a shape that is similar to a trapezoid.

9. A locking device according to claim 8, characterized in that the locking member has a second radial groove adapted to receive the retaining lever when the locking member is in its open position.

10. A locking device according to claim 9, characterized in that the locking member has a free end provided with a hook-shaped nose.

11. A locking device according to claim 10, characterized in that the locking member has a bore for receiving a crowbar or the like.

* * * * *